GEORGE W. BURR.
Plow Clearers.
No. 122,155.    *Fig. 1.*    Patented Dec. 26, 1871.
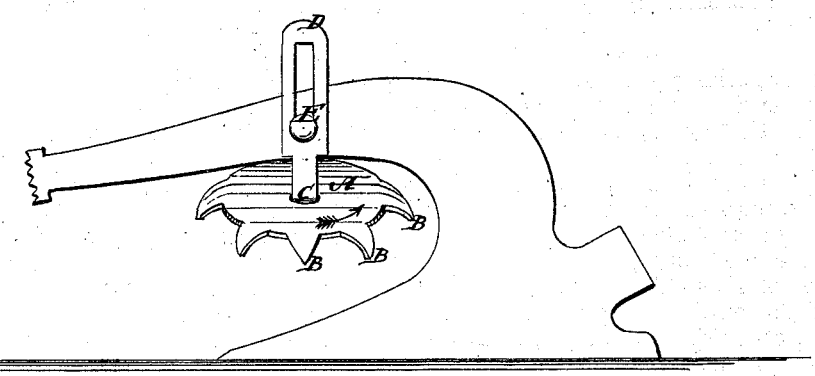
*Fig. 2.*
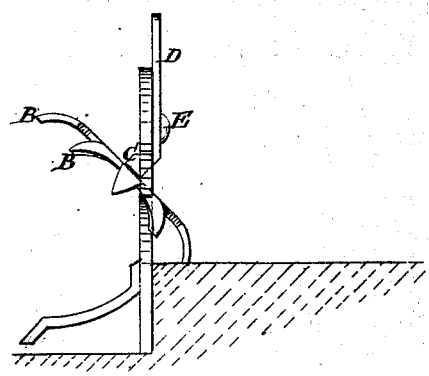
Witnesses:
E. Wolff
Francis McArdle
Inventor:
Geo. W. Burr
Per _____
Attorneys.

UNITED STATES PATENT OFFICE.

GEORGE W. BURR, OF EAST LINE, NEW YORK.

IMPROVEMENT IN PLOW-CLEANER.

Specification forming part of Letters Patent No. 122,155, dated December 26, 1871.

Specification describing a certain Improved Plow-Clearer invented by GEORGE W. BURR, of East Line, in the county of Saratoga and State of New York.

My invention consists in a flat wheel provided with teeth projecting from the circumference at a downward angle and mounted in advance of the throat of the plow on a pivot, so as to revolve in a plane of about forty-five degrees to the surface of the earth, being turned by the contact of the teeth with the solid earth on the land-side in such manner that at the rear side and at the throat the teeth will come in contact with any straw, grass, weeds, and the like, clogging therein and throw them out with the furrow-slice. The support of the said wheel is made vertically adjustable, to vary it according to the depth the plow is to run.

Figure 1 is a side elevation of a plow provided with my improved clearer, and Fig. 2 is a front elevation of the same.

Similar letters of reference indicate corresponding parts.

A is the clearing-wheel. It is made of metal in any way, and provided with teeth which are curved to one side, as shown. This wheel is mounted with the concave side downward or lowermost on the stud C, projecting obliquely under the beam from the land-side, whereon it is supported by the slotted shank D and bolt E, so as to be readily adjusted vertically. This supports the wheel in a plane of about forty-five degrees with the horizon, with the points touching the hard ground on the land-side, and rising at the rear with the furrow-slice on the mold-board side, so that after passing through the throat they engage the furrow-slice and turn with it to some extent. This provides a most simple, efficient, and durable clearer.

Having thus described my invention, I claim as new and desire to secure by Letters Patent—

The clearing-wheel A, provided with curved or downward-projecting teeth, arranged in the throat of the plow, as shown and described.

GEORGE W. BURR.

Witnesses:
GEO. L. THOMPSON,
JOHN J. LEE. (114)